(12) United States Patent
Chenin

(10) Patent No.: US 6,424,595 B1
(45) Date of Patent: Jul. 23, 2002

(54) SEISMIC SYSTEMS AND METHODS WITH DOWNHOLE CLOCK SYNCHRONIZATION

(75) Inventor: Bertrand Chenin, Houston, TX (US)

(73) Assignee: Baker Hughes Incorporated, Houston, TX (US)

(*) Notice: Subject to any disclaimer, the term of this patent is extended or adjusted under 35 U.S.C. 154(b) by 0 days.

(21) Appl. No.: 09/500,656

(22) Filed: Feb. 9, 2000

Related U.S. Application Data

(63) Continuation-in-part of application No. 09/270,944, filed on Mar. 17, 1999, now abandoned.

(51) Int. Cl.$^7$ ................................................ E21C 7/06
(52) U.S. Cl. ........................................ 367/82; 175/48
(58) Field of Search ...................... 702/1, 14; 175/45, 175/27, 40; 367/83, 82, 86, 41, 79

(56) References Cited

U.S. PATENT DOCUMENTS

| | | | | |
|---|---|---|---|---|
| 4,078,620 A | * | 3/1978 | Westlake et al. | ............... 175/48 |
| 4,216,536 A | * | 8/1980 | More | ........................ 367/83 |
| 4,829,489 A | * | 5/1989 | Rector | ......................... 367/82 |
| 4,926,391 A | * | 5/1990 | Rector et al. | .................. 367/41 |
| 5,253,219 A | * | 10/1993 | Houston et al. | ............... 367/79 |
| 5,555,220 A | * | 9/1996 | Minto | ......................... 367/82 |
| 5,600,318 A | * | 2/1997 | Li | .............................. 341/143 |
| 5,720,355 A | * | 2/1998 | Lamine et al. | ................. 175/27 |
| 5,924,499 A | * | 7/1999 | Birchak et al. | ............... 175/40 |

* cited by examiner

Primary Examiner—Edward Lefkowitz
Assistant Examiner—Victor J. Taylor
(74) Attorney, Agent, or Firm—Madan, Mossman & Sriram, P.C.

(57) ABSTRACT

A method and apparatus facilitating the event-synchronized recording of data at different locations, such as may occur at and within a borehole during a Measurement-While-Drilling ("MWD") operations. In a seismic survey the method and apparatus uses three subsystems: 1) a seismic source; 2) a borehole receiver, and 3) a pinger. When used in a borehole containing a drill string, the pinger strikes or vibrates the drill string causing an acoustic signal to traverse the drill string. The signal reaches a borehole receiver where it is detected. The signal is also reflected back up the drill steering to a sensor, nominally an accelerometer sensor, associated with a pinger where it is time-stamped by inclusive timing circuitry. By detecting and recording the round trip travel time of the acoustic signal and using a pulse transmitted from the downhole sensor package, for example, through the drilling mud, remotely occurring events can be synchronized without the use of an electrical connection between the electrically-separated systems recording, time-stamping, and storing the events. Using this method, events time-stamped by clock circuitry located within a borehole sensor package are synchronized to events time-stamped by clock circuitry on the surface to within plus or minus 2 milliseconds or better.

21 Claims, 3 Drawing Sheets

SEISMIC SYSTEMS AND METHODS WITH DOWNHOLE CLOCK SYNCHRONIZATION

CROSS-REFERENCES TO RELATED APPLICATIONS

This application is a continuation-in-part of U.S. application Ser. No. 09/270,944 entitled Seismic Systems and Methods with Downhole Clock Synchronization by Bertrand Chenin, filed on Mar. 17, 1999 now abandoned.

BACKGROUND OF THE INVENTION

1. Field of the Invention

The present invention relates to accurately synchronizing physically separated and electrically isolated clocks used to time-stamp data taken during seismic surveys.

2. Description of the Related Art

It has long been the practice to log wells, that is, to sense various downhole conditions within a well and transmit the acquired data to the surface through a wireline or cable-type equipment. To conduct such logging operations, however, drilling was stopped, and the drill string removed from the well. Since it is costly to stop drilling operations, the advantages of logging while drilling have long been recognized. However, the lack of an acceptable telemetering system has been a major obstacle to successful logging while drilling.

Various telemetering methods have been utilized for logging while drilling. For example, it has been proposed to transmit the acquired data to the surface electrically. Such methods have in the past proved impractical because of the need to provide the drill pipe sections with a special insulated conductor and means to form appropriate connections for the conductor at the drill pipe joints. Other techniques include the transmission of acoustical signals through the drill pipe. Examples of such telemetering systems are shown in U.S. Pat. Nos. 3,015,801 and 3,205,477. In those systems, an acoustic energy signal is sent up the drill pipe and frequency modulated in accordance with a sensed downhole condition.

Other telemetering procedures used during logging-while-drilling operations have used the drilling liquid within the well as the transmission medium. U.S. Pat. No. 2,925,251 discloses a system in which the flow of drilling liquid through the drill string is periodically restricted to cause positive pressure pulses to be transmitted up the column of drilling liquid to indicate a downhole condition. U.S. Pat. No. 4,078,620 discloses a system in which drilling liquid is periodically vented from the drill string interior to the annular space between the drill string and the borehole of the well to send negative pressure pulses to the surface in a coded sequence corresponding to a sensed downhole condition. A similar system is described in the *Oil and Gas Journal,* Jun. 12, 1978, at page 71. Wireless systems have also been proposed using low frequency electromagnetic radiation transmitted through the drill string, the borehole casing, and the earth's lithosphere to the surface of the earth.

Although the wireless transmission systems just discussed have the potential for increasing the efficiency of drilling operations to offset high operating costs, they are all subject to the disadvantages of transmitting information at a relatively slow rate compared to conventional wireline systems, and are subject to inaccuracies because of the high level of noise usually present in drilling operations. Some seismic systems utilize a drill bit as a seismic source of energy received by seismic receivers on the surface. These systems, however, suffer from errors induced by a drift in separate surface and downhole timing clocks which are utilized to synchronize and correlate data collection. Thus, there is a need for increased accuracy timing to support, for example, a geophysical survey taken during a measurement-while-drilling ("MWD") operation. Clocks typically require synchronization to within approximately 2 milliseconds to achieve the desired accuracy for measurement of the time intervals between activation of a seismic event, for example, a seismic signal source transmitting energy at the earth's surface and detecting the transmitted energy at a downhole receiver.

Principles of data recording and transmission for MWD instrumentation are explained in U.S. Pat. No. 4,216,536. MWD instruments typically remain in a borehole for several days between drill bit changes. During those several days, clocks have a tendency to drift. Drift is a less significant problem in regular well logging measurements where well logging measurements can be out of synchronization by several minutes without affecting the integrity of the data. Seismic surveys (referred to as "Checkshot"), however, require rigorous synchronization of the surface and downhole clocks. U.S. Pat. No. 4,829,489, issued to Rector, describes a method for determining travel time using seismic inputs from a drill bit at the end of a drill string to the surface. The '489 patent method uses the drill string as an energy source that is inherent to an MWD operation.

Checkshot or seismic surveys inherently require more accurate timing than general logging due to post collection data processing restrictions. U.S. Pat. No. 5,555,220, issued to Minto, describes a receiver conveyed on a slick line that can be dropped or pumped into a drill pipe for taking checkshot or seismic surveys. The '220 device, however, is limited in the time that the receiver can be left downhole. The surface close and the downhole clock become unsynchronized, necessitating the downhole receiver being removed from the borehole for the sole purpose of synchronizing clocks. In U.S. Pat. No. 5,720,355 issued to Lamine, describes a method for ensuring accurate data collection via electrical communication between physically separated devices.

Thus there is a need for a method and apparatus that enables synchronization of isolated downhole and surface clocks during monitoring-while-drilling operations.

SUMMARY OF THE INVENTION

The present invention provides a structure embodying an apparatus and provides a method which enables synchronization of isolated clocks. The present invention synchronizes two or more physically and electrically isolated clocks, a surface clock and a downhole clock. The clocks are not directly electrically connected except for a possibly conductive drill string. The present invention provides for synchronization of downhole and surface clocks which enhances the accuracy and integrity of seismic data gathered during MWD operations.

The present invention sends a synchronization pulse down the borehole via the drill string. A surface clock is referenced to determine the transmit time for a synchronization pulse which as it is transmitted from the surface. A downhole receiver detects the synchronization pulse. A downhole clock is referenced to determine the time at which the synchronization pulse is received at the downhole receiver. The downhole receipt time is later transmitted to the surface via pulses communicated through the drilling mud or fluid. The synchronization pulse is then reflected from the end of the drill string, at or near the downhole receiver and drill bit, back up the drill string to the surface. The surface clock is then referenced to determine the time at which the synchronization pulse is received at the surface.

The synchronization pulse transmit time is then subtracted from the reflected pulse receipt time to determine the round trip time of the synchronization pulse. The synchronization pulse round trip travel time is divided in half to determine the one-way travel time from the surface to the downhole receiver. This calculated one-way synchronization pulse travel time is added to the synchronization pulse transmit time to calculate when the synchronization pulse should have been received at the downhole receiver. The calculated downhole receipt time is calculated at the surface and references the surface clock. The recorded receipt time is recorded by the downhole receiver and references the downhole clock. The difference between the calculated downhole receipt time and the recorded downhole receipt time represents the difference between the surface clock and the downhole clock. The downhole and surface clocks are then synchronized based on the difference between the calculated downhole receipt time and the recorded downhole receipt time.

Synchronization of the downhole and surface clocks enables a passive seismic receiver to remain downhole for extended periods of time without the need to interrupt operations to retract the seismic receiver, as necessary in the past prior to introduction of the present invention. A seismic receiver, utilizing the present invention can now remain downhole until, for example, it is time to change drill bits. Thus, the duration of maintenance of the seismic receiver in a downhole position may comprise periods of days at a time. The present invention enables precise timing in combination with an existing auto correlation procedure, which enables the use of alternative methods of providing a synchronization pulse to the drill string thereby minimizing the chance of damaging the drill string due to physical impact of generating a synchronization pulse.

The present invention provides a structure and a method that enables simplified data manipulation through enhanced timing accuracy. The structure and method of the present invention also enables utilization of components that are less expensive to manufacture than conventional seismic-while-drilling systems. The present invention enables the use of PDC drill bits while conducting a seismic survey during an monitoring-while-drilling operation and can also be used in a deep water environment where conventional seismic receivers are difficult to deploy.

In another aspect of the present invention a method is provided for recording a seismic survey over extended time intervals using a seismic source near a borehole comprising the detection of energy within the borehole, storing the detected energy and correlating the time of storage with an event represented by time stamps stored at a location remote from the place of storage of the energy stored.

In another aspect of the present invention a method is provided for making accurate seismic measurements, comprising synchronizing events time-stamped by first and second clock circuitry using acoustic energy propagated along a physical component within a borehole and correlating seismic and other data using a procedure depending, at least partially, on synchronization between the first and second clock circuitry.

Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

The present invention will be described with reference to the accompanying drawings, which show important sample embodiments of the invention and which are incorporated in the specification hereof by reference, wherein.

DESCRIPTION OF THE PREFERRED EMBODIMENTS

Figure 1:
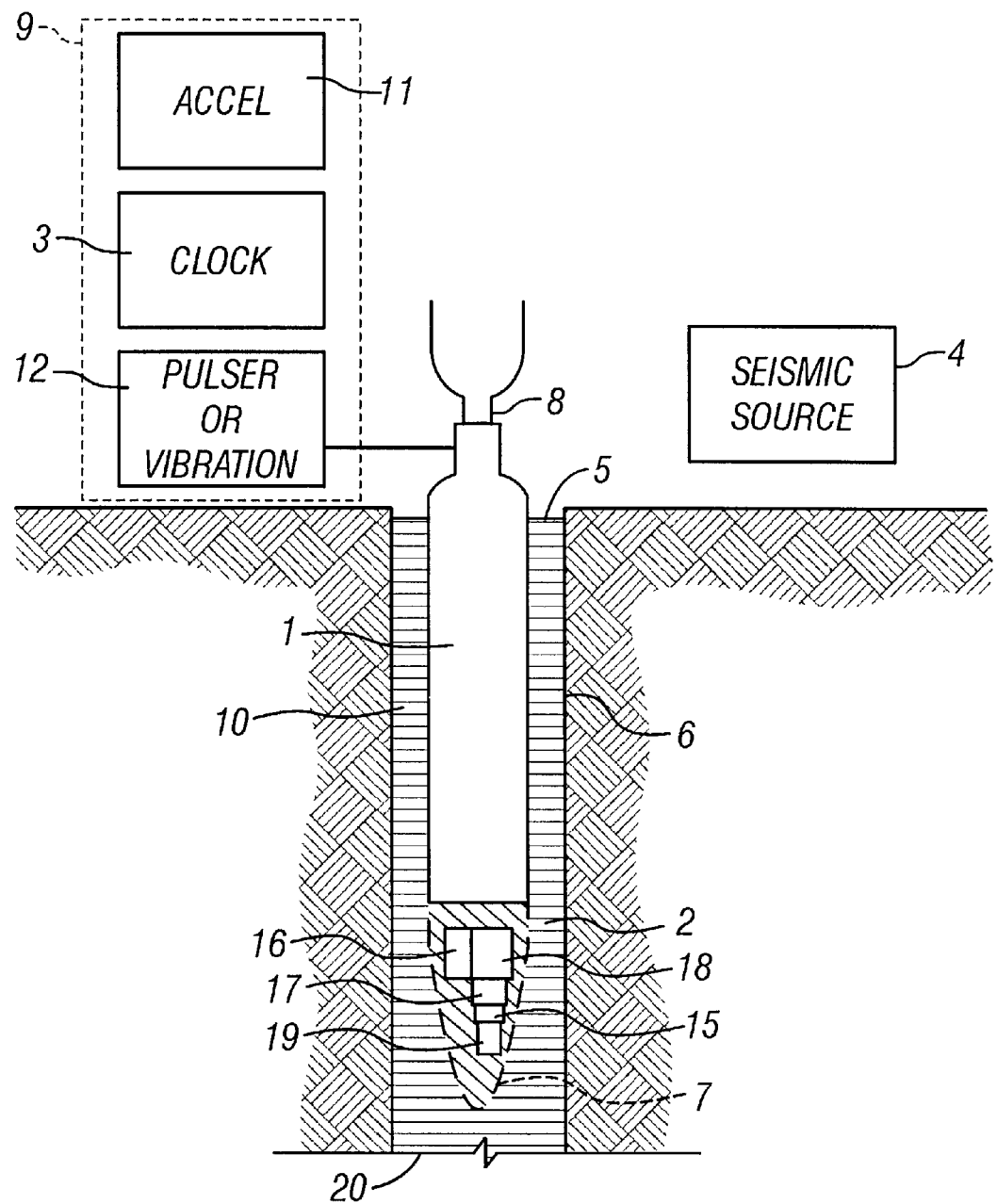
FIG. 1 depicts the vertical orientation of a representative downhole MWD operation.

The numerous innovative teachings of the present invention will be described with particular reference to the presently preferred embodiment, which is provided for example, and not intended as a limitation on the scope of the claimed subject matter. The following are short definitions of the usual meanings of some of the technical terms which are used in the present invention. However, those of ordinary skill in the art will recognize whether the context of the disclosure requires a different meaning.

MWD (Measurement-While-Drilling): A procedure whereby measurements of parameters such as time, temperature, received energy, torque, etc. are taken during drilling operations in a borehole. Pinger: A system for delivering an impulse to a physical component at a precisely known time so that the occurrence of an event at one location can be accurately correlated to a related event at a remote location.

Preferably the present method for seismic measurement, comprises a first synchronizing clock circuitry and a second synchronizing clock circuitry using signals propagated through the borehole and correlating seismic data, using a procedure that depends, at least partially, on synchronization between the first and second clocks.

In a preferred embodiment, a pinger containing a pulser generates and delivers a synchronization pulse. The pulser control electronics references a surface clock to determine when the synchronization pulse is received at the surface as a reflected pulse. The pinger control electronics also calculates the synchronization pulse round trip travel time. Preferably, the pulser transmits the synchronization pulse by striking the drill string in the borehole to generate an acoustic signal or synchronization pulse which travels down the drill string to a downhole receiver. The surface pulser control electronics, references the surface clock, to determine and record the time at which the synchronization pulse is transmitted and the time at which the reflected synchronization pulse is received at the surface. The time at which the reflected surface pulse is received at the surface is referred to as the reflected time stamp.

The surface pulse is transmitted down the drill string in the borehole and received by a downhole receiver. The downhole receiver, referencing a downhole clock, records the time at which the downhole receiver receives the transmitted surface pulse. The time at which the downhole receiver receives the transmitted surface pulse is referred to as the down hole time stamp. The downhole receiver transmits the downhole time stamp back to the surface by transmitting the downhole time stamp encoded in pulses and transmitted through the drilling mud. The downhole time stamp is received at the surface by a surface detector and utilized to synchronize the surface clock and the downhole clock.

The round trip travel time for the surface pulse is divided in half to determine one-way travel time. This one-way travel time is added to the surface pulse send time to calculate when the surface pulse should have been received at the downhole receiver. The calculated downhole receipt time references the surface clock. The actual receipt time references the downhole clock. The difference between the calculated receipt time and the recorded receipt time represents the difference between the surface clock and the downhole clock. The downhole and surface clock are synchronized based on this difference.

By detecting and recording the duration or time interval representing round trip travel time of the synchronization pulse from the surface to the bottom of the borehole and back to the surface, that is, the time elapsed between transmission of the first synchronization signal and receipt of the reflected synchronization pulse, this information enables synchronization of the surface and downhole clocks to account for drift between the two clocks. This information enables synchronization of remotely occurring events recorded at different locations which enhances the accuracy of seismic measurements performed during drilling operations which rely on accurate time references. For example, a internal surface clock and a separate isolated downhole internal reference clock are synchronized to within 2 msec or less.

Figure 3:
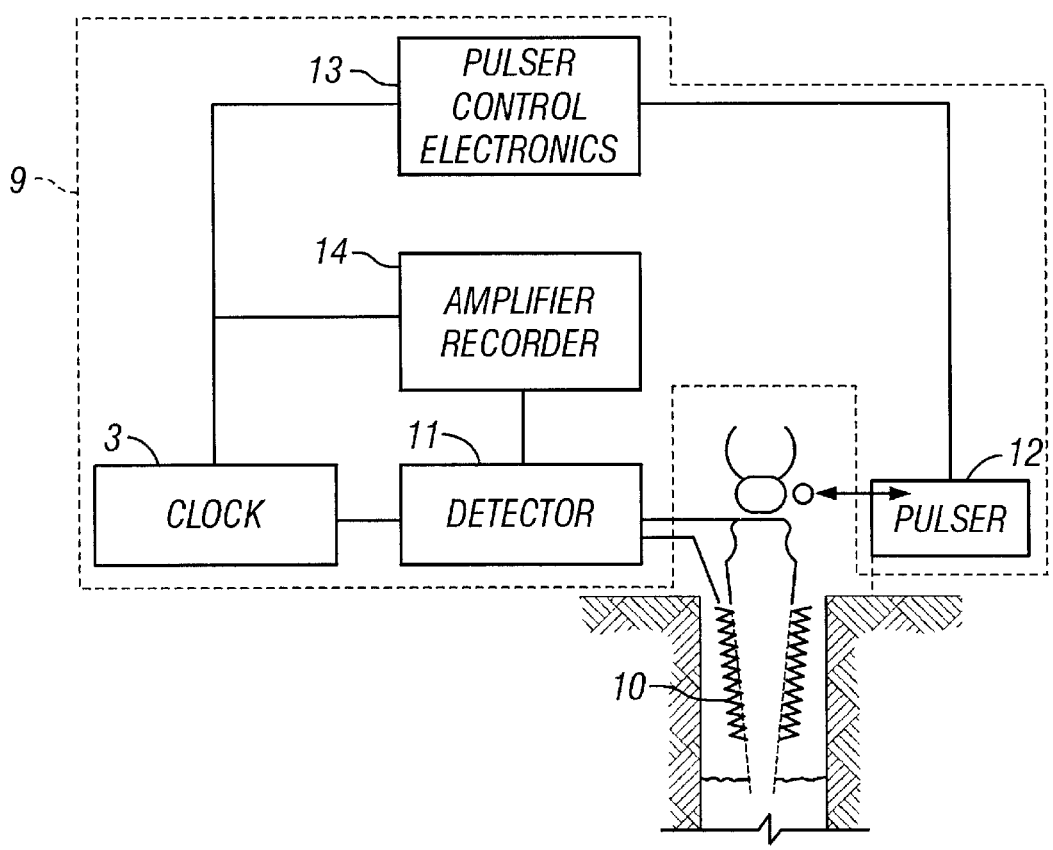
FIG. 3 is a simplified block diagram of a preferred pinger as provided by the present invention.

The method and apparatus of the present invention integrates three (3) subsystems for the purpose of making accurate seismic surveys over extended time intervals. These subsystems are depicted in use in FIG. 1. Turning now to FIG. 1, the key subsystems used with applicant's method of taking a seismic survey during MWD operations comprises: (i) a downhole receiver having an internal clock incorporated into a downhole sensor package 2; (ii) a seismic source 4 located near the surface entrance 5 of the borehole 6 containing the downhole sensor package 2; and (iii) a pinger 9, which includes an internal clock 3, is located on the surface adjacent the drill string. A simplified block diagram of pinger 9 is shown in FIG. 3. The three (3) subsystems shown in FIG. 3 act together to enable obtaining an accurate measurement of time of travel through the drill string 1 of pulses or sweeps generated by pinger 9.

In a typical seismic or geophysical survey, the apparatus and method of the present invention would be used as follows: (i) pinger 9 is placed adjacent entrance 5 of a borehole 6 in which a drill string 1, complete with a downhole sensor package 2 attached thereto, is in operation. A seismic source 4, such as a sleeve-gun-array, positioned on the surface near the entrance 5 of the borehole 6, is energized so as to provide an acoustic signal containing desired seismic data, but not having time synchronization incorporated therein, for receipt at the downhole receiver 17 within the downhole sensor package 2. The acoustic receiver receives the energy corresponding to seismic data and controller 14 sends it to a recorder 16 within the downhole sensor package 2 where the data is time-stamped via an internal clock 18 and stored. The seismic data depends on the synchronization of the surface and downhole clocks. Ideally the surface clock and the downhole clock read the same time. The downhole clock may tend to drift due to temperature variations or other factors downhole. The present invention enables detection of the clock drift and subsequent adjustment and synchronization of the surface and downhole clocks to compensate for this drift between the downhole and surface clocks.

Preferably, pinger 9 is positioned in physical contact with a portion of the top of the drill string 1, for example, a location just below the swivel 8. Pinger 9 provides a pulser 12 to generate an impulse such as a mechanical pulse or, alternatively, a "swept vibration," to the drill string 1. This impulse is referred to as a surface pulse. A detector 11, preferably a detection instrument such an accelerometer or other sensor and associated electronics is provided as part of the pinger 9, detects, records and stores in recorder 14, the surface synchronization pulse or sweep transmitted by the pinger 9 and the time, determined by reference to surface clock 3, at which the pulse or sweep is transmitted downhole.

The synchronization pulse is received downhole by downhole sensor package 2, comprising downhole reference clock 18, recorder 16, transmitter 15, downhole receiver 17 and controller 19. The downhole sensor package controller 19 sends to the downhole recorder 16 the synchronization pulse receipt time at the downhole sensor package receiver 17. The downhole receipt time is encoded and transmitted to the surface by downhole transmitter 15. In a preferred embodiment, the downhole transmitter sends the downhole receipt time to the surface detector 11 by encoding downhole receipt time into pulses and sending the encoded pulses to the surface via the drilling mud 10 to surface detector 11. The downhole receipt time does not have to be stored in recorder 14.

The surface detector 11 also detects and records the time at which the reflected synchronization pulse is received at the surface. The synchronization pulse, preferably is reflected back up the drill string 1, however, the synchronization pulse reflection may be detected through the drilling mud 10 in an alternative embodiment. Preferably the downhole receipt time is transmitted to the surface after the reflected synchronization pulse is received at the surface, however, it can be transmitted immediately and distinguished at the surface by special encoding or by simple temporal relationships, such as a delay between the reflected pulse and the pulses representing the downhole receipt time. The synchronization pulse round trip travel time is calculated by the pinger control electronics 13. These steps are repeated on an "as needed" basis to synchronize the downhole clock with the surface clock until such time as the drill bit is removed from the borehole when seismic data acquisition is concluded.

The present invention provides a method for accurately synchronizing a clock in a drill pipe or drill string 1 conveyed sensor 2, e.g., a "downhole sensor package," to a surface clock operating remotely, e.g., on the earth's surface. The downhole and surface clocks have no direct electrical connection between them. A seismic source 4, such as a sleeve-gun array or a vibrator, is energized near the borehole opening 5. Seismic source 4 provides energy to enable collection of seismic survey data. Seismic source 4 provides no timing synchronization function. A sensor package 2 within the borehole 6 contains an acoustical receiver 17, such as a hydrophone or a geophone, and associated electronics comprising recorder 16, downhole clock 18 and transmitter 15 which act in conjunction to control, detect, record, encode and transmit the downhole receipt time. The measurements are taken while drilling, hence, the term Measurement-While-Drilling ("MWD") is used to describe the procedure.

The drill string 1 located within the borehole comprises a series of interconnected pipes with a drill bit 7 within the borehole at the borehole's end and a swivel 8 at the surface end of the drill string. The drill string 1, or an equivalent "wireline" is suspended in the borehole, and used as a conveyance over which a "signal" or synchronization pulse is sent to the downhole sensor package. A pinger 9 that can be maintained separately from the drill string 1 generates this signal or synchronization pulse. The pinger 9 is brought into physical contact with the drill string 1 just below the swivel 8 and energized to perform clock synchronization. Upon communication of a synchronization pulse or swept vibration surface signal by pulser 12 within pinger 9 to the drill string 1, the associated acoustic signal is conveyed down the drill string to the acoustic receiver 17 in the downhole sensor package 2. The time at which the synchronization pulse is transmitted downhole is determined by pulse control electronics 13 in reference to surface clock 3 and recorded by recorder 14.

Upon receipt of the pinger surface pulse or surface signal, downhole sensor package controller 14 determines the receipt time in reference to downhole clock 18, records the receipt time on recorder 16, and transmitter 15 initiates a downhole receipt signal, including the time at which the synchronization pulse was received downhole, the downhole receipt time and transmitter 15 sends the downhole receipt time to the surface via pulses transmitted through the drilling mud 10. In an alternative embodiment the downhole receipt time is not stored before sending it to the surface. The downhole receipt time is received and detected at the surface by a detector 11, which is preferably an accelerometer sensor, at the surface and time-stamped at the surface by a surface clock 3.

After the synchronization pulse from pulser 13 reaches the bottom of the drill string, it is reflected back to the top of the drill string 1 where it is detected by the surface detector 11, time-stamped by the surface internal clock 3, and recorded by control electronics associated with the surface clock 3. The synchronization pulse may also be reflected off of the bottom of the borehole 20 and back through the drill string 1 or drilling mud 10. This synchronization procedure and apparatus thus determines and records the round trip travel time for the synchronization pulse traveling through the drill string. The calculated one-way travel time for the surface to the bottom of the wellbore is determined by dividing the round trip travel time in half. The one-way travel time is added to the time at which the synchronization pulse was transmitted to calculate the theoretical time at which the surface pulse was received at the downhole receiver 17.

The calculated or theoretical down receipt time, referencing surface clock 3 is compared to the measured downhole receipt time, which references downhole clock 18. The difference between the calculated and measured downhole receipt times is used to determine if the surface clock 3 and the downhole clock 17 are synchronized and if not, to synchronize them. Thereby, the surface and downhole clocks can be synchronized as necessary by the present invention.

By using an autocorrelation technique to process the data, a swept frequency vibration signal can alternatively be used in place of a mechanical impulse to generate an acoustic synchronization signal in the drill string. This alternative procedure should prove useful when the drill string is so lengthy that a physical pulse suitable to traverse its length may physically damage the drill string 1 when the pulser 13 strikes the drill string 1. Alternatively, a swept vibrator provides a lower amplitude synchronization signal over a longer period of time, thereby providing suitable synchronization energy without causing physical damage to the drill string 1. Using either synchronization signal source, this synchronization process is preferably carried out on an "as needed" basis.

Figure 2:
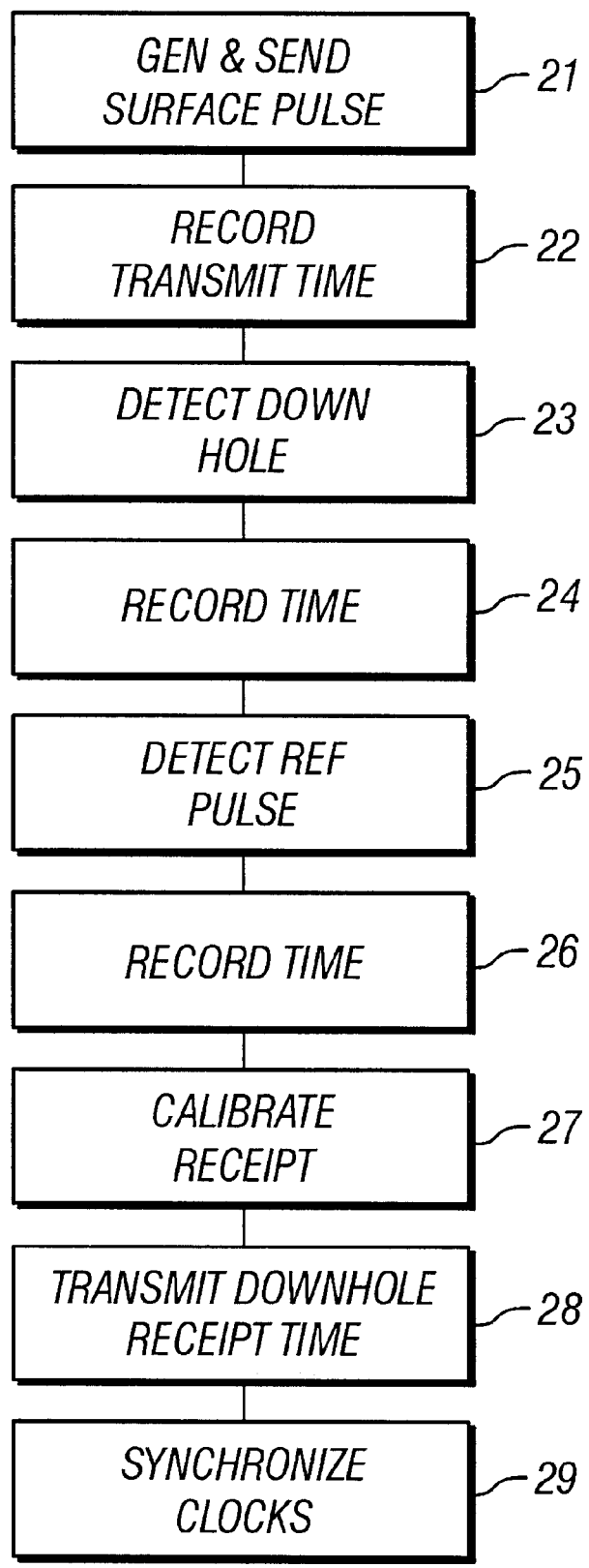
FIG. 2 illustrates the method present invention.

Turning now to FIG. 2, the preferred method of the present invention is shown. In step 21, the pulser 13 generates and sends a synchronization pulse. In step 22 the synchronization pulse transmit time is recorded by the pulser 13 electronics referencing the surface clock. In step 23, the synchronization pulse is detected downhole by downhole receiver 17. In step 24, the downhole receipt time is determined. It may be useful to store the downhole receipt time as shown in step 24. In step 25, the reflected synchronization pulse is received at the surface by detector 11 and the receipt time is determined referencing surface clock 3. It may be useful to record the reflected pulse receipt time as in step 26. In step 27, pulser control electronics 13 calculates the round trip and one-way travel times for the synchronization pulse and determines the calculated downhole receipt time for the synchronization pulse. In step 28, the measured downhole receipt time, which references the downhole clock, is sent to the surface. In step 29, the calculated downhole receipt time and the measured downhole receipt time are compared and used to synchronize the downhole clock with the surface clock. For example, if the calculated downhole receipt time is 5 milliseconds greater than the measured downhole receipt time, this indicates that the downhole clock is 5 milliseconds behind the surface clock. This, the 5 millisecond differential can be accounted for by adding 5 milliseconds to the downhole times or by synchronizing the downhole clock by adding 5 milliseconds to the downhole clock. The amount of synchronization needed by the downhole clock can be transmitted downhole by an encoded pulse stream transmitted via the drill string or the drilling fluid.

In a preferred embodiment, the synchronizing method and apparatus of the present invention determines "quiet" times during drilling operations. The drill bit produces seismic energy during drilling, thus it may become problematic to determine which seismic signals are a result of the seismic source located near the surface and which seismic signals are a result of noise generated by the drill bit during drilling. Therefore, signals received by the downhole receiver are processed by a downhole processor to determine an average drill bit noise signature. Once this average is determined, the recorder will record seismic signals only during periods when the drill noise drops below this predetermined average. By only recording seismic signals during these "quiet" times, the amount of data to be processed and stored is reduced and the integrity of the data is increased.

As will be recognized by those skilled in the art, the innovative concepts described in the present invention can be modified and varied over a tremendous range of applications, and accordingly the scope of claimed subject matter is not limited by any of the specific exemplary teachings given. Although the novel features described above have been described with reference to acoustic signals generated by a "pulser," other methods of time correlation would accomplish the same objectives. For example, rather than sending an acoustic signal down the drill string, an electromagnetic signal could be generated that traveled down the borehole through the drilling fluid or drill string and reflected back up to the surface through the drilling fluid or drill string. In another example, a pulse in the drilling fluid could be generated at the surface and its travel time down and back up the borehole used to synchronize the surface clock and the downhole clock. In another embodiment the initial pulse could be sent from the downhole receiver where round trip travel time could be calculated and compared to actual receipt time determined by and transmitted from the surface. In another possible modification, intermediate signal generators or amplifiers could be located within the borehole between the surface and the bottom, to regenerate or amplify the signal so that the signal is strong enough to travel the entire length of the borehole.

The present disclosed methods and systems may be used with both on-shore seismic exploration as well as with maritime petroleum exploration, including deepwater environments. The foregoing describes the salient features of inventors method and apparatus for taking a seismic survey during an MWD operation, and should not be interpreted as limiting the application of, method of operation, or uses for inventors method to that specified in the foregoing. While the method and apparatus have been shown with specific components and subsystems, and further described with regard to a specific order of implementation, it will be understood by those skilled in the art that various other changes in the selection of components and use with a different order of steps, or other details, may be changed without departing from the spirit and scope of the inventors method.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. A method for synchronizing an isolated surface clock and a downhole clock comprising:
    transmitting a synchronization pulse from the surface down a borehole to a downhole receiver at a known transmission time based on a surface clock;
    receiving the synchronization pulse at the downhole receiver;
    determining a measured time at which the synchronization pulse is received at a downhole receiver based on a downhole clock;
    receiving at the surface, a reflected synchronization pulse;
    determining the time at which the reflected synchronization pulse was received at the surface;
    calculating a round trip travel time for the synchronization pulse to travel from the surface, down the borehole and back to the surface;
    calculating a downhole receipt time, based on the known transmission time plus on half of the round trip travel time;
    transmitting the downhole receipt time to the surface; and
    synchronizing the surface and downhole clocks based on a difference between the calculated downhole receipt time and the measured downhole receipt time.

2. The method of claim 1, wherein the synchronization pulse is transmitted down the borehole via a drill string.

3. The method of claim 2, wherein the synchronization pulse is generated by physically striking the drill string at the surface of the borehole.

4. The method of claim 1, wherein the synchronization pulse travels down the drill string.

5. The method of claim 1, wherein the reflected synchronization pulse travels up the drill string.

6. The method of claim 1 further comprising the step of correlating seismic data, using a procedure that depends, at least partially, on synchronization between first and second clocks.

7. The method of claim 1, wherein the synchronization signal is an acoustic signal.

8. The method of claim 7, wherein the acoustic signal comprises at least on mechanical pulse induced on the drill string.

9. The method of claim 1, wherein the synchronization signal comprises at least one pressure pulse generated in drilling fluid inside the borehole.

10. The method of claim 1, wherein said synchronization signal is an electromechanical wave induced on a drill string.

11. The method of claim 1, wherein the downhole receipt time is not transmitted to the surface until after the reflected pulse has been received at the surface.

12. The method of claim 1, wherein the synchronization signal is amplified inside the borehole before reaching the bottom of the borehole.

13. An apparatus for synchronizing a surface clock and a downhole clock during wellbore operations comprising:
    a device for communicating a synchronization pulse from the surface to a bottom of the wellbore;
    a surface clock and controller for timing events at the surface, wherein the controller is also used for synchronizing the downhole clock with the surface clock;
    a surface detector for sensing events at the surface;
    a downhole receiver for receiving the synchronization pulse;
    a downhole clock and controller for timing events down the borehole; and
    a downhole transmitter for transmitting downhole event times to the surface.

14. The apparatus of claim 13, wherein the synchronization pulse comprises an acoustic energy impulse generated by physically striking a drill string located in the wellbore.

15. The apparatus of claim 13, wherein the surface controller determines a round trip travel for the synchronization pulse by subtracting the time at which the synchronization pulse is transmitted from the time at which the reflected synchronization pulse is received at the surface, wherein the surface controller calculates the receipt time at the downhole receiver of the synchronization pulse.

16. The apparatus of claim 13, wherein the downhole controller determines the downhole receipt time, the time at which the synchronization pulse is received at the downhole receiver.

17. The apparatus of claim 16, wherein the downhole transmitter transmits the downhole receipt time to the surface via pulses transmitted through the drilling mud.

18. The apparatus of claim 17, wherein the pulses are acoustic pulses.

19. The apparatus of claim 17, wherein the pulses are pressure pulses.

20. The apparatus of claim 17, wherein the surface controller determines the difference between the downhole receipt time transmitted by the downhole receiver to the receipt time calculated by the surface control and uses the difference to determine if the downhole clock is synchronized with the surface clock.

21. The apparatus of claim 20, wherein the surface controller synchronizes the downhole clock with the surface clock.

* * * * *